United States Patent [19]

Kirsch et al.

[11] Patent Number: 4,505,442
[45] Date of Patent: Mar. 19, 1985

[54] TRANSIENT SURFACE CONTACT VEHICLE

[75] Inventors: Jerome Kirsch, Dix Hills; M. Alan Kopsco, Wantagh; Edward Markow, Oakdale; Michael Sturm, Flushing, all of N.Y.

[73] Assignee: Grumman Aerospace Corporation, Bethpage, N.Y.

[21] Appl. No.: 505,815

[22] Filed: Jun. 20, 1983

[51] Int. Cl.³ .......................... F41G 9/00; F42B 15/20
[52] U.S. Cl. .................... 244/3.15; 89/1.11; 102/411; 114/272; 244/3.1; 244/50; 244/105
[58] Field of Search .................. 244/3.1, 3.15, 50, 105, 244/106; 102/362, 411, 293; 89/1 A; 114/271-283

[56] References Cited

U.S. PATENT DOCUMENTS

| 1,728,937 | 9/1929 | Kemp | 114/272 |
| 1,779,168 | 10/1930 | Isom | 244/81 |
| 2,972,974 | 2/1961 | Follett | 114/66.5 |
| 2,992,794 | 7/1961 | Boyd | 244/3.15 |
| 3,216,391 | 11/1965 | Jones | 114/66.5 |
| 3,838,642 | 10/1974 | Shimberg | 102/411 |
| 3,842,774 | 10/1974 | Kinder | 114/66.5 H |
| 3,917,022 | 11/1975 | Brooks, Jr. | 114/61 |
| 3,960,103 | 6/1976 | Rey | 114/66.5 R |
| 4,003,291 | 1/1977 | Vass et al. | 102/411 |
| 4,080,922 | 3/1978 | Brubaker | 114/282 |
| 4,296,894 | 10/1981 | Schnabele et al. | 244/3.1 |
| 4,420,129 | 12/1983 | Stetter | 244/3.15 |

FOREIGN PATENT DOCUMENTS 216905  6/1924  United Kingdom ................ 102/411

Primary Examiner—Charles T. Jordan
Attorney, Agent, or Firm—Daniel J. Tick; Richard G. Geib

[57] ABSTRACT

A transient surface contact vehicle for transporting a load from a surface starting point to a surface end point has a structure for carrying the load from the starting point to the end point. A vehicle support extends from the structure. A buoyancy control device mounted in the structure is coupled to the vehicle support for selectively making the support buoyant and non-buoyant whereby when the support is buoyant it abuts the surface of a body of water thereby supporting the vehicle at a predetermined distance above the surface of the body of water. An acquisition sensor mounted on the structure initiates water surface operations. A sensor is mounted on the structure and cooperates with the acquisition sensor to energize upon tracking of the target and to move the vehicle along the water surface to impact with the target at the end point. A position control mounted on the vehicle produces a negative pitching moment to maintain the structure in surface-following contact with the body of water.

20 Claims, 7 Drawing Figures

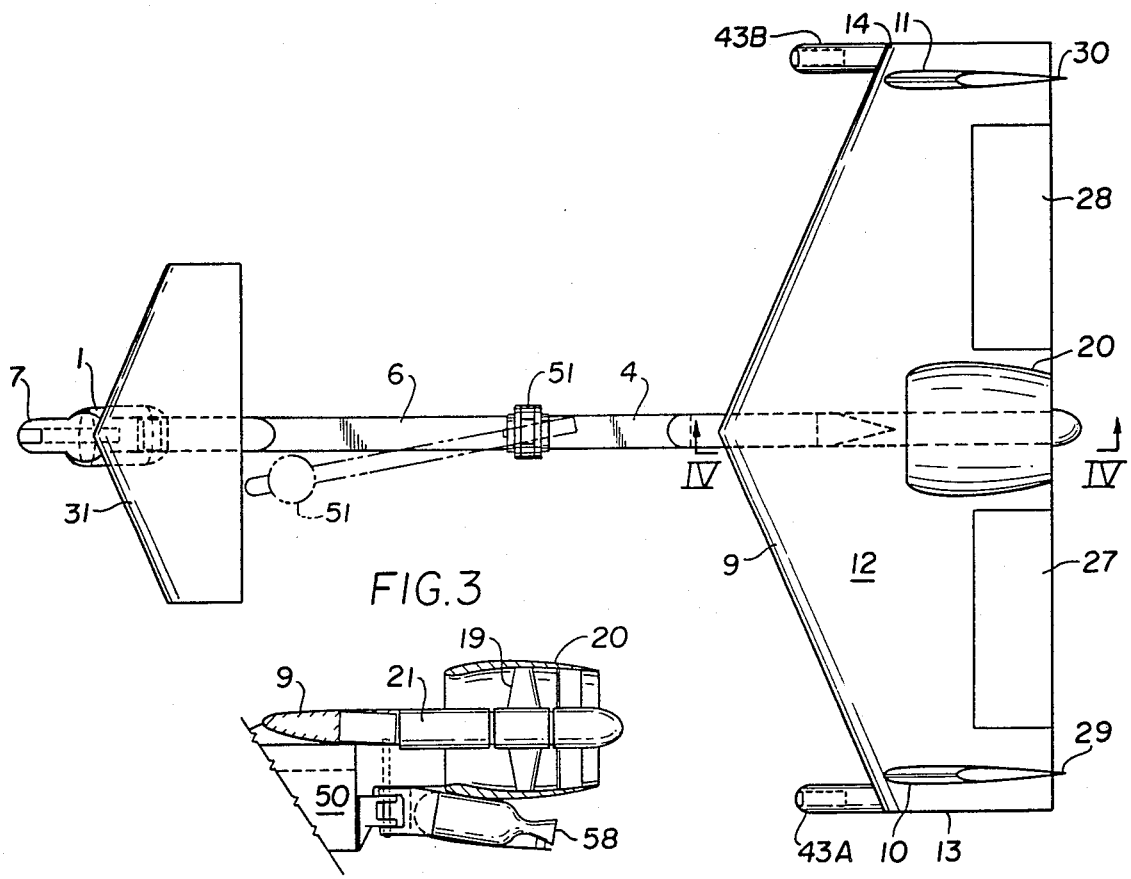
FIG.3
FIG.4
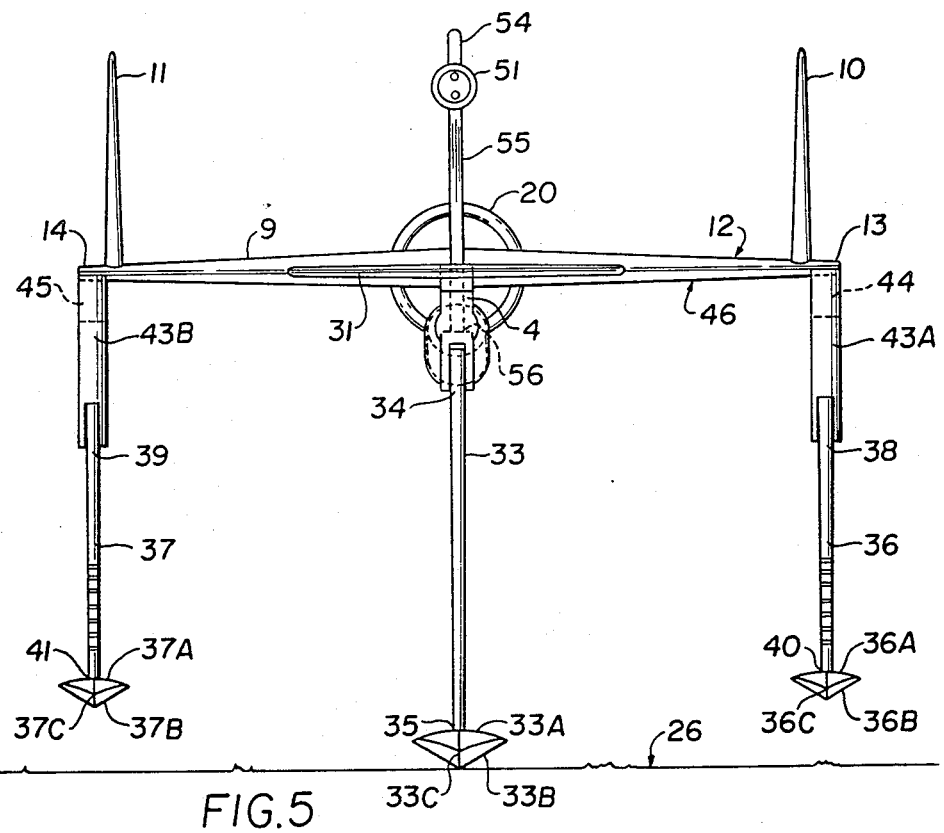
FIG.5

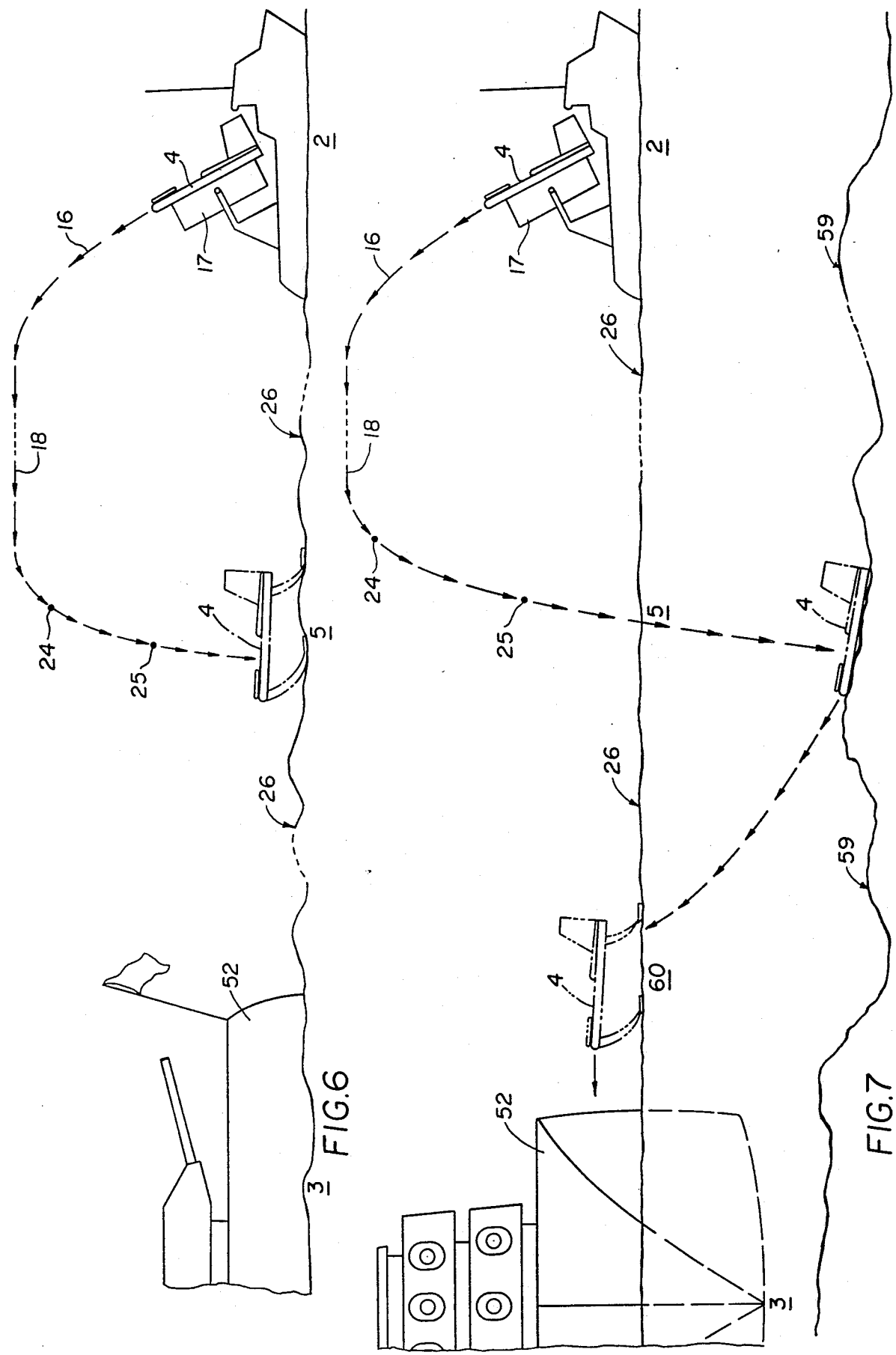

TRANSIENT SURFACE CONTACT VEHICLE

BACKGROUND OF THE INVENTION

The present invention relates to a transient surface contact vehicle. More particularly, the invention relates to a combination aircraft and transient surface contact vehicle for transporting a load from a surface starting point to a surface end point. The present invention is another embodiment of the terrain-following transient surface contact vehicle described in a pending patent application Ser. No. 505,809, filed June 20, 1983.

Known transient contact vehicles, and, more specifically, water surface attack vehicles, cannot move rapidly, especially over choppy or high seas, and are unstable in waves.

The principal object of the invention is to provide a transient contact vehicle which moves at high speed over all kinds of water surfaces.

An object of the invention is to provide a transient contact vehicle which moves at high speed over choppy and high seas.

Another object of the invention is to provide a transient contact vehicle which retains its stability in moving over all kinds of water surfaces.

Yet another object of the invention is to provide a transient contact vehicle which maintains accurate water level reference for precision hits on targets.

Another object of the invention is to provide a transient contact vehicle of simple structure which maintains constant surface-following contact with a body of water over which it moves at high speed, retains its stability and locates and impacts a target in the water with efficiency, reliability and accuracy.

Still another object of the invention is to provide an autonomous transient contact vehicle which moves at high speed over all kinds of water surfaces.

Yet another object of the invention is to provide an autonomous transient contact vehicle which aerodynamically controls its motion on water in six degrees of freedom including lowering its height above the water surface along which it moves for specific military attack applications.

Another object of the invention is to provide a robotic autonomous water attack vehicle which maintains a stable, constant surface-following contact with a body of water over which it moves at high speed.

Still another object of the invention is to provide a robotic autonomous mobile mine which moves at high speed over irregular water surfaces and locates and impacts a target efficiently and accurately with accurate water level reference for a precision hit on the target.

The locomotion performance of the vehicle of the invention represents a significant departure from conventional sea-going locomotion techniques. It also profoundly increases water surface attack speeds as compared to conventional seagoing vehicles. The vehicle of the invention provides impressive open-loop "ground flight" performance in the presence of rough water surfaces.

The vehicle of the invention, designed as a disposable round, represents a new transient water surface contact vehicle class which features duplicity of aerodynamic controls usage both for self-airborne delivery and for high speed autonomous water surface attack. With modest extensions of an air vehicle configuration, in terms of equipment and cost, the virtues of both air and sea vehicle classes are obtained. That is, the vehicle can provide the long ranges generically classical of air vehicles, as well as the high endurance, such as time on station for target acquisition, attendant to water vehicles. Rocket propulsion is provided during water attack to generate the vehicle speeds necessary for aerodynamic control effectiveness. A single "transient contact" compliant strut and pontoon is utilized to interface the surface of the water. Vehicular speeds of greater than 60 Knots are achieved. These are judged fast enough to "win" against all types of naval surface vessels.

BRIEF SUMMARY OF THE INVENTION

In accordance with the invention, a transient surface contact vehicle for transporting a load from a surface starting point to a surface end point comprises a structure for carrying the load from the starting point to the end point. Vehicle supports extend from the structure. A buoyancy control device is mounted on the structure and coupled to the vehicle supports for selectively making the supports buoyant and non-buoyant whereby when the supports are buoyant the supports abut the surface of a body of water thereby supporting the vehicle at a predetermined distance above the surface of the body of water. An acquisition sensor is mounted on the structure for initiating water surface operations. A sensor is mounted on the structure and cooperates with the acquisition sensor to sense and track a target in the water at the end point upon initiation of water surface operations. A power unit is mounted on the structure and cooperates with the sensor to energize upon tracking of the target and to move the vehicle along the water surface at the predetermined distance above the surface to impact with the target at the end point. A position control is mounted on the structure for producing a negative pitching moment to maintain the structure in surface-following contact with the body of water.

The structure has a beam having a nose and a spaced opposite tail end, a wing mounted thereon at the tail end and fins extending substantially perpendicularly from the surface of the wing. The position control includes wing flaperons and fin rudders for directional and roll control during water surface movement and a canard pivotally mounted on the beam in the area of the nose thereof for pitch control to produce the negative pitching moment to maintain the structure in contact with the water surface during the movement of the structure along the water surface and prevent take-off of the structure.

The vehicle support includes a forward strut pivotally mounted at one end at the nose of the structure and having a forward pontoon-like device constantly abutting the water surface at its spaced opposite end and a pair of outrigger struts pivotally mounted at one end at the opposite tips of the wing and having aft pontoon-like devices abutting the water surface at their spaced opposite ends.

The load comprises an explosive charge. The power unit comprises rocket propulsion means and the fins comprise a pair of fins each at a corresponding tip of the wing.

Strut releases including timers are mounted on the structure and coupled to the outrigger struts for separating the outrigger struts from the structure at a predetermined time after actuation of the power unit, if desired. Each of the struts comprises a substantially rigid tube curved at its opposite end and having a substantially teardrop shaped cross-section for reducing drag and strengthening the strut in the primary bending direction. Each of the outrigger struts is mounted at a corresponding tip of the wing and each of the forward and outrigger struts is curved at its opposite end.

A sensor is coupled to the canard for driving the canard full nose down to collapse the forward strut at the end point thereby to bring the structure down to the water surface just prior to impact with the target, if desired.

A retractable mast is pivotally affixed to the beam at one end and positioned next-adjacent the beam prior to movement of the structure. An erecting device is mounted on the beam and coupled to the mast for positioning the mast substantially perpendicularly to the beam and above the beam. The sensor is mounted on the mast at the spaced opposite end thereof. A plurality of resilient devices, dampers and shock absorbers are mounted on the structure at each of the struts and coupled to the struts for urging the pontoon-like devices of the struts against the water surface as the vehicle moves along the surface.

When the pontoon-like devices of the supports are made non-buoyant by the buoyancy control, the structure sinks in a body of water and the pontoon-like devices are retracted and abut the bottom of the body of water. The pontoon-like devices have substantially flat bottom surfaces with prow-like noses.

When the pontoon-like devices are made buoyant by the buoyancy control, the structure floats up in the body of water until the pontoon-like devices abut the water surface, the pontoon-like devices are extended from the structure and the power unit moves the vehicle along the water surface at the predetermined distance above the water surface and the position control means maintains the structure in surface-following contact with the body of water to impact with the target at the end point.

In accordance with the invention, a combination aircraft and transient surface contact vehicle for transporting a load from a surface starting point to a surface end point comprises an aerodynamic structure carrying the load from the surface starting point to a first intermediate point of the surface of a body of water by air. A programmable navigation device mounted on the structure directs the vehicle from the starting point to the first intermediate point via a flight path preset in the navigation device. A flight power unit is mounted on the structure for powering the vehicle for flight in a cruise path between the points programmed in the navigation device. A position control is mounted on the structure and cooperates with the navigation device at a preset point in the cruise path thereby permitting the vehicle to glide to a preset altitude above the water surface at the intermediate point whereupon the vehicle settles onto the water surface from the altitude. Vehicle supports are retracted during flight and extend from the structure prior to settling onto the water surface. Alternatively, the vehicle can be placed at the intermediate point by a friendly ship, in which case the navigation device is not used. After such placement, the vehicle will remain on the water surface or sink to the bottom, depending on the buoyancy control setting. A buoyancy control is mounted on the structure and coupled to the vehicle supports for selectivity making the supports buoyant and non-buoyant whereby when the supports are buoyant the supports abut the water surface thereby supporting the vehicle at a predetermined distance above the surface of the body of water. An acquisition sensor is mounted on the structure for initiating water surface operations. A sensor is mounted on the structure and cooperates with the acquisition sensor to sense and track a target in the water at the end point upon initiation of water surface operations. A surface power unit is mounted on the structure and cooperates with the sensor to energize upon tracking of the target and to move the vehicle along the water surface at the predetermined distance above the water surface to impact with the target at the end point.

The structure has a beam having a nose and a spaced opposite tail end, a wing mounted thereon at the tail end and fins extending substantially perpendicularly from the surface of the wing. The position control includes wing flaperons and fin rudders for directional and roll control during flight and water surface movement and a canard pivotally mounted on the beam in the area of the nose thereof for pitch control to produce a negative pitching moment to maintain the structure in contact with the water surface during movement of the structure along the water surface and prevent take-off of the structure.

The vehicle support includes a forward strut pivotally mounted at one end at the nose of the structure and having a forward pontoon-like device constantly abutting the water surface at its spaced opposite end and a pair of outrigger struts pivotally mounted at one end at the opposite tips of the wing and having aft pontoon-like devices abutting the water surface at their spaced opposite ends upon settling on the water surface and means for absorbing landing impact energy.

The flight power unit comprises a propeller rotatably mounted on the beam at the tail end thereof, an electric motor mounted on the beam and coupled to the propeller to drive same and a source of electrical energy connected to the motor for energizing the motor. Alternatively, an internal combustion engine may be utilized. The load comprises an explosive charge. The surface power unit comprises rocket propulsion means and the fins comprise a pair of fins each at a corresponding tip of the wing.

Strut releases including timers are mounted on the structure and coupled to the outrigger struts for separating the outrigger struts from the structure at a predetermined time after actuation of the surface power unit, if desired. Each of the struts comprises a substantially rigid tube curved at its opposite end and having a substantially teardrop shaped cross-section for reducing draft and strengthening the strut in the primary bending direction. Each of the outrigger struts is mounted at a corresponding tip of the wing and each of the forward and outrigger struts is curved at its opposite end.

A sensor is coupled to the canard for driving the canard full nose down to collapse the forward strut at the end point thereby to bring the structure down to the water surface just prior to impact with the target, if desired.

A retractable mast is pivotally affixed to the beam at one end and positioned next-adjacent the beam during flight of the structure. An erecting device is mounted on the beam and coupled to the mast for positioning the mast substantially perpendicularly to the beam and above the beam. The sensor is mounted on the mast at the spaced opposite end thereof. A plurality of resilient devices, dampers and shock absorbers are mounted on the structure at each of the struts and coupled to the struts for urging the pontoon-like devices of the struts against the water surface as the vehicle moves along the surface.

When the pontoon-like devices of the support are made non-buoyant by the buoyancy control, the structure sinks in a body of water and the pontoon-like devices are retracted and abut the bottom of the body of water. The pontoon-like devices have substantially flat bottom surfaces with prow-like noses.

When the pontoon-like devices are made buoyant by the buoyancy control, the structure floats up in the body of water until the pontoon-like devices abut the water surface at a second intermediate point whereupon the pontoon-like devices are extended from the structure and the power unit moves the vehicle along the water surface at the predetermined distance above the water surface and the position control maintains the structure in surface-following contact with the body of water to impact with the target at the end point.

BRIEF DESCRIPTION OF THE DRAWINGS

In order that the invention may be readily carried in effect, it will now be described with reference to the accompanying drawings, wherein:

FIG. 3 is a partial plan view, partly in section, taken along the lines III—III, of FIG. 2;

FIG. 4 is a view, taken along the lines IV—IV, of FIG. 3;

FIG. 5 is a view, taken along the lines V—V, of FIG. 2; and

FIG. 6 is a schematic diagram showing a first mode of operation of the vehicle of the invention; and FIG. 7 is a schematic diagram showing a second mode of operation of the vehicle of the invention.

DETAILED DESCRIPTION OF PREFERRED EMBODIMENTS

Figure 1:
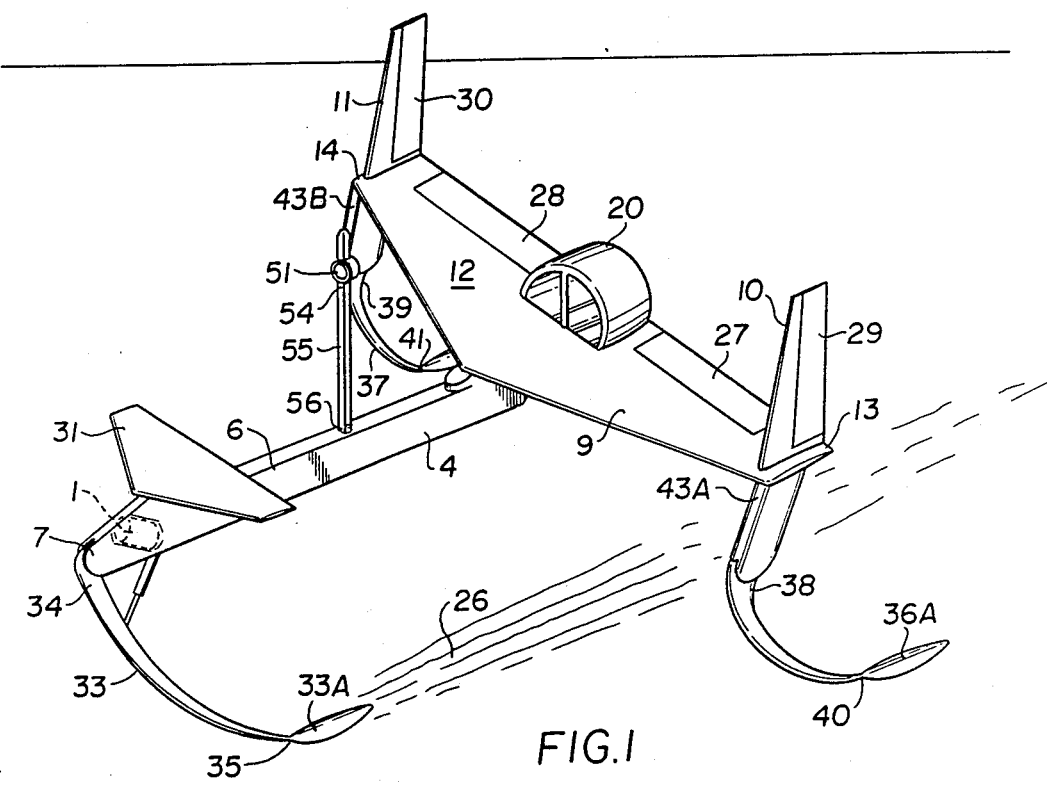
FIG. 1 is a perspective view of an embodiment of the transient surface contact vehicle of the invention.

The vehicle of the invention is a combination aircraft and transient surface contact vehicle for transporting a load or payload 1 (FIGS. 1 to 3) such as, for example, an explosive charge, from a surface starting point 2 to a surface end point 3 (FIGS. 6 and 7). The vehicle 4 (FIGS. 1 to 3, and 5 to 7) comprises an aerodynamic structure carrying the load 1 from the surface starting point 2 to a first water surface intermediate point 5 (FIGS. 6 and 7) by air, as shown in FIGS. 6 and 7.

Figure 2:
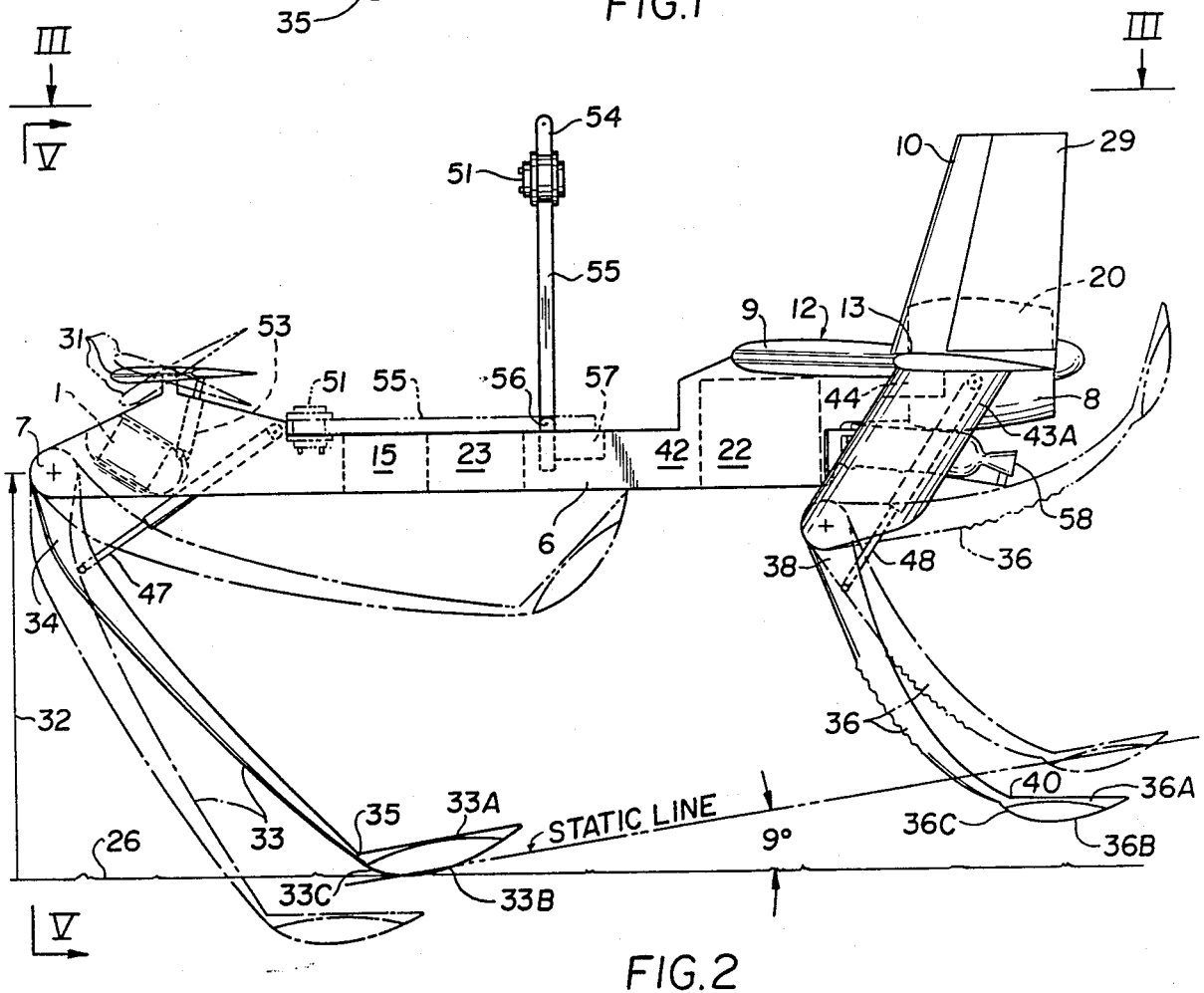
FIG. 2 is a side view, on an enlarged scale, of the embodiment of FIG. 1.

The aerodynamic structure has a beam 6 with a nose 7, as shown in FIGS. 1 to 3, and a spaced opposite tail end 8 (FIGS. 2 and 3). A wing 9 (FIGS. 1 to 5) is mounted on the beam 6 at the tail end 8 and a pair of fins 10 and 11 extend substantially perpendicularly from the upper surface 12 of said wing, each at a corresponding tip of said wing (FIGS. 1 and 5). Thus, the fin 10 extends from the surface of the wing 9 at the tip 13 of said wing and the fin 11 extends from the surface of said wing at the tip 14 of said wing, as shown in FIGS. 1 and 5.

A programmable navigation device 15 (FIG. 2) of any suitable known type is mounted in or on the beam 6 for directing the vehicle 4 from the starting point 2 to the first intermediate point 5 via a flight path 16 (FIG. 6) preset in said navigation device. The flight path 16 may, of course, be preset by external means 17 (FIGS. 6 and 7) of any suitable type utilized to launch the vehicle 4.

A flight power unit is mounted on the beam 6 for powering the vehicle 4 for flight in a cruise path 18 (FIGS. 6 and 7) between the points 2 and 5 programmed in the navigation device 15. The flight power unit comprises a propeller 19 rotatably mounted in a shroud 20 on the beam 6 at the tail end 8 thereof, as shown in FIG. 4. An electric motor 21 (FIG. 4) of any suitable known type, is mounted on the beam 6 and coupled to the propeller 19 to drive said propeller. The motor 21 is electrically connected to any suitable source of electrical energy such as, for example, a battery 22 (FIG. 2). Alternatively, an internal combustion engine may be substituted for the electric motor.

A position control device 23 (FIG. 2) of any suitable known type is mounted on the beam 6 and cooperates with the navigation device 15 at a preset point 24 in the cruise path 18 (FIGS. 6 and 7) thereby permitting the vehicle 4 to glide to a preset altitude 25 above the surface 26 of the water at the intermediate point 5, as shown in FIGS. 6 and 7, whereby said vehicle settles onto said surface from said altitude in the mode of operation illustrated in FIG. 6. The water surface 26 illustrated in FIGS. 6 and 7 covers a long distance.

The position control device 23 includes wing flaperons 27 and 28 (FIGS. 1 and 3) of any suitable known type and fin rudders 29 and 30 (FIG. 1) for directional and roll control during flight and surface movement of the vehicle 4. The position control device 23 further includes a canard 31 (FIGS. 1 to 3 and 5) pivotally mounted on the beam 6 in the area of the nose 7 thereof for pitch control to produce a negative pitching moment to maintain the structure in contact with the surface 26 during movement of said structure along said surface and prevent take-off of said structure.

Vehicle supports are retracted during flight, as shown by broken lines in FIG. 2, and extend from the structure or vehicle 4 prior to settling on the surface 26 of the water, as shown by solid lines in FIGS. 1, 2, 5 and 6, thereby supporting said vehicle at a predetermined distance 32 above said water surface (FIG. 2). The vehicle support includes a forward strut 33 pivotally mounted at one end 34 at the nose 7 of the beam 6 (FIGS. 1, 2 and 5). A forward pontoon-like device 33A of any suitable known type as affixed to the spaced opposite end 35 of the forward strut 33 and abuts the water surface 26 (FIGS. 1, 2 and 5). The forward pontoon-like device 33A has a substantially flat bottom surface 33B with a prow-like nose 33C and constantly abuts the surface 26 of the water, as shown in FIGS. 1, 2 and 5. The extreme forward broken line position of the forward strut shown in FIG. 2 is its deployed no-load position.

The vehicle support further includes a pair of outrigger struts 36 and 37 pivotally mounted at one end 38 and 39, respectively, of the wing 9 (FIGS. 1 and 5). Aft pontoon-like devices 36A and 37A of any suitable known type are affixed to the spaced opposite ends 40 and 41, respectively, of the outrigger struts 36 and 37, respectively, similar to the forward pontoon-like device 33A. Once the vehicle 4 is in motion, the aft pontoon-like devices 36A and 37A become elevated, while the forward pontoon-like device 33A continues to ride on and abut the water surface 26 upon settling on said water surface (FIGS. 1, 2 and 5). The aft pontoon-like devices 36A and 37A have substantially flat bottom surfaces 36B and 37B, respectively, with prow-like noses 36C and 37C, respectively, and abut the surface 26 of the water. This is shown by solid lines in FIG. 2. The outrigger struts 36 and 37 are retracted during flight, as is the forward strut 33, as shown by broken lines in FIG. 2. The forward broken line position of the outrigger struts 36 and 37, shown for the strut 36 in FIG. 2, is its static load position and the solid line position of said outrigger struts, shown for said strut in FIG. 2, is its no-load position.

A buoyancy control 42 (FIG. 2) of any suitable known type, including a source of compressed gas, tubing extending from such source and electric signal-controlled valves at the pontoon-like devices 33A, 36A and 37A (not shown in the FIGS.) is mounted on the beam 6 and coupled via such tubing (not shown in the FIGS. in order to maintain clarity of illustration) to said pontoon-like devices. The buoyancy control 42 functions to selectively make the pontoon-like devices 33A, 36A and 37A buoyant and non-buoyant. When the pontoon-like devices 33A, 36A and 37A are buoyant, their bottoms 33B, 36B and 37B, respectively, abut the water surface 26 thereby supporting the vehicle 4 at the predetermined distance 32 above said surface, is shown in FIGS. 1 and 2.

Strut releases 43A and 43B, respectively, including timers 44 and 45, respectively, as shown in FIG. 5, are mounted on the wing 9 at the tips 13 and 14, respectively, of said wing and extend substantially perpendicularly from the lower surface 46 of said wing. The strut releases 43A and 43B are coupled to the outrigger struts 36 and 37, respectively, and function, if desired, to separate or jettison said struts from the vehicle 4 at a predetermined time after actuation of the surface power unit, hereinafter described. Each of the struts 33, 36 and 37 comprises a substantially rigid tube curved at both its ends 34 and 35, 38 and 40, and 39 and 41, respectively, and having a substantially teardrop shaped cross-section for reducing drag and for strengthening the strut in the primary bending direction. Each of the struts 33, 36 and 37 has a resilient device, damper and shock absorber 47, 48 and 49, respectively, mounted on the structure or vehicle 4 and coupled to the corresponding struts 33, 36 and 37, respectively, for urging the pontoon-like devices 33A, 36A and 37A, respectively, of said struts against the surface 26 of the body of water as said vehicle moves along said water surface. Although the units 47 and 48 are shown in FIG. 2, the unit 49 is not shown in the FIGS.

An acquisition sensor 50 of any suitable known type is mounted on or in the beam 6, as shown in FIG. 4, for initiating surface operations.

A sensor 51 (FIGS. 1 to 3 and 5) of any suitable known type is mounted on the beam 6 and cooperates with the acquisition sensor 50 to sense and track a target 52 (FIGS. 6 and 7) at the end point 3 (FIGS. 6 and 7) upon initiation of water surface operations. The sensor 51 is coupled to the canard 31 by any suitable linkage, not shown in the FIGS., for driving said canard full nose down, as shown in broken lines in FIG. 2, via a canard control unit 53 (FIG. 2) of any suitable known type, to collapse the forward strut 33 at the end point 3 (FIG. 6) thereby to bring the vehicle 4 down to the water surface 26 just prior to impact with the target 52, if desired, so that said target is struck at the waterline or below.

The sensor 51 is preferably mounted at one end 54 of a retractable mast 55 (FIGS. 1, 2 and 5) which is pivotally affixed to the beam 6 at its spaced opposite end 56 (FIGS. 1, 2 and 5). The mast 55 is positioned next-adjacent the beam 6 during flight, as shown by broken lines in FIG. 2. An erecting device 57 (FIG. 2) of any suitable known type is mounted on or in the beam 6 and coupled to the mast 55 (FIG. 2) for positioning said mast substantially perpendicularly to said beam and above said beam, as shown by solid lines in FIGS. 1, 2 and 5, for surface operations.

A surface power unit 58 (FIGS. 2 and 4) is mounted on the beam 6 and cooperates with the sensor 51 to energize upon tracking of the target 52 and to move the vehicle 4 along the surface 26 of the body of water at the predetermined distance 32 (FIG. 2) above said surface to impact with said target at the end point 3 (FIGS. 6 and 7). The surface power unit 58 preferably comprises rocket propulsion means. The rocket system is preferably pivotally mounted on the beam 6 and linked to the rudders 29 and 30 by any suitable known linkage, so that the rocket thrust is suitably directed at all times and augments the rudder steering forces, particularly at low initial velocities.

In first and second naval operations or military applications, illustrated in FIGS. 6 and 7, the vehicle 4 of the invention, in its container, is taken from the ammunition resupply point and carried to a launch site approximately 10 to 15 km from the forward edge of a battle area. The launch site may be on a seagoing vessel or on land. From this known site, which is the starting point 2 in FIGS. 6 and 7, predetermined destination coordinates and cruise altitude are entered into the control panel. Maximum altitude is normally set at 200 to 300 meters above the highest terrain. A switch is turned on, enabling an automatic deployment and erection sequencer which starts autonomous operations. After the lapse of a predetermined period of time, the container lid erects with the vehicle 4 at approximately a 70 degree launch angle. A solid rocket boosts the vehicle to cruise altitude, which may vary between 250 to 1,200 meters. The solid rocket falls off and a cruise mode begins, preferably powered by the electrical propulsion flight power unit utilizing a rare earth permanent magnet motor 21 in combination with a lithium thionyl chloride battery 22. The vehicle 4 navigates to the point 24 (FIGS. 6 and 7) in air space at which power-off descent begins. A height detector is turned on and, in the first embodiment of a military operation, shown in FIG. 6, at approximately 20 feet from the water surface 26, a flare-up maneuver is initiated which safely "crash lands" the vehicle on the surface of the water approximately 30 minutes after launch. Alternatively, the vehicle can be placed at the intermediate point by a friendly ship, in which case the navigation device is not used. After such placement, the vehicle will remain on the water surface or sink to the bottom, depending on the buoyancy control setting.

In the operation shown in FIG. 6, the "large-stroke" skid or forward strut 33 and two outrigger struts 36 and 37 and their pontoon-type devices 33A, 36A and 37A, respectively, limit the impact with the surface 26 of the body of water to a few g's, and lower the center of gravity for a stable landing. A stationary target acquisition mode then commences. Static naval or water operations are initiated by the acquisition sensor 50 (FIG. 4), which preferably functions by acoustics and keys the electro-optic seeker or sensor 51 (FIG. 2) which tracks the naval target 52. When the sensor 51 "locks on" the target 52, the rocket 58 is ignited and rapidly develops surface attack speeds sufficient for aerodynamic control. Sensor errors are then nulled by the vehicle controls until impact with the target 52, resulting in detonation of the load or shaped charge warhead 1. If, after a preset time, targets are not acquired or attacked, the vehicle 4 will self-destruct.

In the second embodiment of a military operation, shown in FIG. 7, the buoyancy control 42 initially makes the pontoon-like devices 33A, 36A and 37A non-buoyant. Thus, when the vehicle 4 is crash-landed, or placed on the surface 26 of the water, it sinks in the body of water and the pontoon-like devices are retracted and abut the bottom 59 of the body of water. When the buoyancy control 42 makes the pontoon-like devices 33A, 36A and 37A buoyant and said vehicle floats up in said body of water until said pontoon-like devices abut said water surface 26 at a second intermediate point 60 (FIG. 7) said pontoon-like devices are extended from said vehicle and the surface power unit 58 moves said vehicle along said water surface at said predetermined distance above said water surface. The position control device 23 maintains the vehicle 4 in surface-following contact with the body of water to impact with said target 52 at the end point 3. The second intermediate point 60 may be precisely at the target 52 or it may be a distance therefrom.

The vehicle 4 carries a shaped charge anti-ship payload or load 1 for killing or disabling a naval vessel or ship, preferably by hitting it near or under the water level. Emplacement is accomplished either by completely autonomous airborne flight and landing, to preset coordinates, for purposes of penetrating the enemy's second naval echelon 50 to 60 km away or by direct emplacement by a friendly ship. The attack phase of the mission is completely autonomous. The rocket-propelled surface attack covers a distance of 1000 meters or more, while the sensor 51 tracks the target 52. The vehicle 4 maintains physical contact with the surface 26 of the body of water at all times during the attack, via the compliant forward struct 33. Once sufficient forward velocity is achieved, the aerodynamic surfaces previously used for flight provide most of the support as well as roll, pitch and steering forces.

The vehicle 4 is a single-purpose system, not a multi-mission platform, and the configuration may reflect a totally integrated approach, including commonality of equipment casing and primary structure where feasible. The vehicle 4 operates acceptably both in the air and on uneven seas or water surfaces.

The baseline scheme with the three struts 33, 36 and 37 for landing, and the single forward strut 33 after the attack begins has the general advantages of high surface clearance with low weight penalty, ability to shift from high to very low surface clearance when near the target by having the canard 31 exert aerodynamic forces that collapse or retract said forward strut, low drag in all mission phases, particularly if stowed in flight, a common control system for flight and water surface attack and long strokes to absorb landing impact energy.

The fundamental features of the transient surface contact vehicle of the invention are the aft wing 9, the aft flight power unit, the canard 31 for pitch control, the twin rudders 29 and 30 and flaperons 27 and 28 for directional and roll control, all controls used during both flight and attack, the three strut arrangement for landing, the single forward strut 33 retained for attack, and the payload 1 as far forward as practicable.

Although the center portion of the body may house some electronics, it is primarily the long beam 6 connecting forward and aft masses. This arrangement maximizes vehicle pitch moment of inertia, which is desirable in reducing response to transient surface disturbances. Conversely, it would be desirable from a weight, cost, and handling standpoint to make the body as short as possible. The length thus ultimately depends upon the required relationship between the forward strut 33 contact point and the vehicle center of gravity.

The body shown in the FIGS. is a simple rectangular box beam 6 which can withstand bending and torsional loads induced by landing and control forces. A full span wing box fastens to this body beam to form the primary structure. The wing-fuselage tie may be a snap-together field connection to reduce container dimensions. Material for the primary structure will be chosen based on lightweight and low cost in high-volume production. The remainder of the wing 9 and the control surfaces, which are the canard 31, the rudders 29 and 30 and the flaperons 27 and 28, are designed using advanced RPV techniques to minimize weight. It is possible to mold each major component in one operation, incorporating primary structure, aerodynamic contour and structural hard points such as, for example, engine mounts, in a single-composite unit.

The vehicle 4 is steered in the air and on the surface by the twin rudders 29 and 30 mounted on top of the wing outboard of the flaperons 27 and 28. The rudders 29 and 30 operate synchronously, with throws of ±20 deg. Optionally, steering forces may be augmented during surface attack by pivoting the attack rocket 58 about a vertical axis, as shown in FIG. 4, and slaving its deflection to that of the rudders 29 and 30 by a tie rod. The flaperons 27 and 28 extend from the propeller shroud 20 to each rudder 29 and 30 and have a constant chord. All motion occurs about a single hinge line, that is, no chord extension mechanism.

The vehicle 4 is launched by rocket. The launch rocket and its mounting drop-off at burnout and are not shown in FIGS. The rocket thrust line is through the center of gravity. If the cruise propeller 19 is not started until the rocket drop-off, the rocket will be mounted in line with the propeller arcs. If the cruise propeller is utilized to augment the launch thrust, the rocket will be mounted in tandem with the attack rocket. The initiation of thrust cocks a spring loaded jettison mechanism, which then acts automatically when thrust terminates. The correct launch angle is achieved by using the shipping container as a platform. Deployment and erection may be automatic; if not, elements of the container (not shown in FIGS.) can be swung into position as front legs, which are adjusted in length until case-mounted levels are centered.

Once it reaches altitude, the vehicle 4 is propelled by the high rpm shrouded propeller 19 driven by the electric motor 21. An internal combustion engine may be utilized as an alternative. The components are arranged so that the propeller 19 and shroud 20 are centered vertically about the wing 9 and the thrust line passes near the center of gravity.

In the attack mode, propulsion is supplied by the solid rocket 58. The thrust line is aimed somewhat below the center of gravity to counteract nose down pitching due to forward strut drag during the initial segment of attack time before aero controls are effective.

The first task of the strut system is to absorb all of the vehicle's forward and vertical kinetic energy during the autonomous, power-off landing. During cruise, the forward centerline strut 33 and the two outrigger or wing tip struts 36 and 37 are pivoted back for low drag. They are deployed during the flare maneuver. Landing attitude assures that the aft struts 36 and 37 impact first, generally one before the other, and together they absorb most of the energy while traveling through their full stroke. Energy absorption is by one-shot components, such as crushable honeycomb blocks (not shown in the FIGS.), which drop into place near each strut's pivot during deployment. The forward or nose strut 33 impacts slightly later and also undergoes most of its stroke. Crushable honeycomb may or may not be needed for the forward strut.

All the struts 33, 36 and 37 have restoring springs, and the forward strut 33, at least, incorporates a shock absorber. After impact stroking, all the struts 33, 36 and 37 redeploy slowly to intermediate positions corresponding to static load. This recovery time is designed to allow forward velocity to terminate while the center of gravity is close to the surface, reducing the possibility of tip-over. A simple pin system could be used to block strut recovery and keep the vehicle 4 in a surface-hugging position until its seismic sensor is stimulated, whereupon the pins would be removed as part of the imaging-sensor turn-on sequence. This would reduce the possibilities of detection of the vehicle 4 by the enemy.

The aft struts 36 and 37 are shaped in side view to contact the surface progressively toward their pivots when stroking, and their upper portions are equipped with high friction surfaces to slow forward velocity on landing. During the attack phase, the aft struts are only required for a short time to stabilize the vehicle 4 until it is supported aerodynamically. After that they may be a liability, interfering with roll maneuvers and passage through choppy water. Therefore, at a timed interval following the ignition of the attack rocket 58, the struts 36 and 37 and their entire ventral supporting structure can be automatically separated from the wing 9 by pyrotechnic devices. The forward strut 33, on the other hand, is used throughout the attack as a physical reference to the surface 26, a partial vertical support, an obstacle impact absorber, and a protective bumper/skid. The structural and dynamic characteristics of the strut 33 must be optimized in terms of all of these functions, and to properly interact with the control system.

Near the end of the attack, perhaps one second before impact, the forward strut 33 can be fully stroked by driving the canard 31 full nose down and disengaging the strut pivot spring. This brings the payload 1 down to water surface level for maximum lethality. This concept allows the wing, canard and body or beam of the vehicle 4 to have a much greater clearance over choppy water during most of the attack run than would otherwise be possible. Ideally, the signal for this lowering maneuver comes from a sensing of target distance.

The struts are stiff hollow tubes. All spring and damping characteristics are provided by separate devices. The tubes preferably have a teardrop cross-section, to reduce drag when deployed and to provide strength in the primary bending direction. Alternatively, the spring and damping functions may be incorporated in the strut itself by designing the strut as a series of high strength sheets, thin in the side view, separated by high hysteresis elastomer layers. This entire sandwich could be tailored to have an increasing spring rate with increasing deflection.

The sensor 51 is installed so that minimum mass is placed atop the mast 55. For launch, cruise and landing approach the mast 55 is pivoted forward and strapped down to the body so that when used for navigation the sensor 51 can view directly down. The sensor 51 is used for navigation aiding. Subsequent to landing, the mast 55 is released, and stored spring energy causes it to rotate to an erect position approximately five feet above the surface. Full azimuth scan is possible except for the two small sectors blocked by the vertical fins. Fore-and-aft location of the mast 55 is selected to avoid interference with canard airflow and payload effectiveness. The downward looking in-flight position is acceptable for the type of sensor aiding required.

A preliminary 3 degree-of-freedom simulation showed profound surface traverse characteristics. These stable characteristics were also obtained with a completely passive open loop system. Rather adverse, dramatic vehicle attitude changes would result if the vehicle 4 were to traverse the surface in pure flying condition, since the lightly damped phugoid mode would be excited. For proper operation, the canard 31 is fixed at a nominal small deflection which, due to the inherent stability of the vehicle 4, produces a negative pitching moment, hence a surface reaction force. This is crucial and results in a very stable system.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall with the scope of the appended claims.

We claim:

1. A transient surface contact vehicle for transporting a load from a surface starting point to a surface end point, said vehicle comprising a structure for carrying said load from said starting point to said end point;

vehicle support means extending from said structure;

buoyancy control means mounted on said structure and coupled to said vehicle support means for selectively making said support means buoyant and non-buoyant whereby when said support means are buoyant said support means abut the surface of a body of water thereby supporting said vehicle at a predetermined distance above said surface of said body of water;

acquisition sensing means mounted on said structure for initiating water surface operations;

sensing means mounted on said structure and cooperating with said acquisition sensing means to sense and track a target in said water at said end point upon initiation of water surface operations;

power means mounted on said structure and cooperating with said sensing means to energize upon tracking of said target and to move said vehicle along said water surface at said predetermined distance above said surface to impact with said target at said end point; and position control means mounted on said structure for producing a negative pitching moment to maintain said structure in surface-following contact with said body of water.

2. A transient surface contact vehicle as claimed in claim 1, wherein said structure has a beam having a nose and a spaced opposite tail end, a wing mounted thereon at said tail end and fin means extending substantially perpendicularly from the surface of said wing, and wherein said position control means includes wing flaperons and fin rudder means for directional and roll control during water surface movement and a canard pivotally mounted on said beam in the area of the nose thereof for pitch control to produce said negative pitching moment to maintain said structure along said water surface and prevent take-off of said structure.

3. A transient surface contact vehicle as claimed in claim 2, wherein said vehicle support means includes a forward strut pivotally mounted at one end at the nose of said structure and having a forward pontoon-like device constantly abutting said water surface at its spaced opposite end and a pair of outrigger struts pivotally mounted at one end at the opposite tips of said wing and having aft pontoon-like devices abutting said water surface at their spaced opposite ends.

4. A transient surface contact vehicle as claimed in claim 3, wherein said load comprises an explosive charge, said power means comprises rocket propulsion means and said fin means comprises a pair of fins each at a corresponding tip of said wing.

5. A transient surface contact vehicle as claimed in claim 3, further comprising strut release means including timer means mounted on said structure and coupled to said outrigger struts for separating said outrigger struts from said structure at a predetermined time after actuation of said power means, and wherein each of said struts comprises a substantially rigid tube curved at its opposite end and having a substantially teardrop shaped cross-section for reducing drag and strengthening said strut in the primary bending direction, each of said outrigger struts is mounted at a corresponding tip of said wing and each of said forward and outrigger struts is curved at its opposite end.

6. A transient surface contact vehicle as claimed in claim 3, wherein said sensing means is coupled to said canard for driving said canard full nose down to collapse said forward strut at said end point thereby to bring said structure down to said surface just prior to impact with said target.

7. A transient surface contact vehicle as claimed in claim 3, further comprising a retractable mast pivotally affixed to said beam at one end and positioned next-adjacent said beam prior to movement of said structure and erecting means mounted on said beam and coupled to said mast for positioning said mast substantially perpendicularly to said beam and above said beam, said sensing means being mounted on said mast at the spaced opposite end thereof and a plurality of resilient means, damping means and shock absorbing means mounted on said structure at each of said struts and coupled to said struts for urging said pontoon-like devices of said struts against said water surface as said vehicle moves along said surface.

8. A transient surface contact vehicle as claimed in claim 3, wherein when said pontoon-like devices of said support means are made non-buoyant by said buoyancy control means, said structure sinks in a body of water and said pontoon-like devices are retracted and abut the bottom of the body of water.

9. A transient surface contact vehicle as claimed in claim 8, wherein said pontoon-like devices have substantially flat bottom surfaces with prow-like noses.

10. A transient surface contact vehicle as claimed in claim 8, wherein when said pontoon-like devices are made buoyant by said buoyancy control means, said structure floats up in said body of water until said pontoon-like devices abut said water surface, said pontoon-like devices are extended from said structures and said power means moves said vehicle along said water surface at said predetermined distance above said water surface and said position control means maintains said structure in surface-following contact with said body of water to impact with said target at said end point.

11. A combination aircraft transient surface contact vehicle for transporting a load from a surface starting point to a surface end point, said vehicle comprising
 an aerodynamic structure carrying said load from said surface starting point to a first intermediate point of the surface of a body of water by air;
 programmable navigation means mounted on said structure for directing said vehicle from said starting point to said first intermediate point via a flight path preset in said navigation means;
 flight power means mounted on said structure for powering said vehicle for flight in a cruise path between said points programmed in said navigation means;
 position control means mounted on said structure and cooperating with said navigation means at a preset point in said cruise path thereby permitting said vehicle to glide to a preset altitude above the water surface at said intermediate point whereby said vehicle settles onto said water surface from said altitude;
 vehicle support means retracted during flight and extending from said structure prior to settling onto said water surface;
 buoyancy control means mounted on said structure and coupled to said vehicle support means for selectively making said support means buoyant and non-buoyant whereby when said support means are buoyant said support means abut said water surface thereby supporting said vehicle at a predetermined distance above said surface of said body of water;
 acquisition sensing means mounted on said structure for initiating water surface operations;
 sensing means mounted on said structure and cooperating with said acquisition sensing means to sense and track a target in said water at said end point upon initiation of water surface operations; and
 surface power means mounted on said structure and cooperating with said sensing means to energize upon tracking of said target and to move said vehicle along said water surface at said predetermined distance above said water surface to impact with said target at said end point.

12. A combination aircraft and transient surface contact vehicle as claimed in claim 11, wherein said structure has a beam having a nose and a spaced opposite tail end, a wing mounted thereon at said tail end and fin means extending substantially perpendicularly from the surface of said wing, and wherein said position control means includes wing flaperons and fin rudder means for directional and roll control during flight and surface movement and a canard pivotally mounted on said beam in the area of the nose thereof for pitch control to produce a negative pitching moment to maintain said structure in contact with said water surface during movement of said structure along said water surface and prevent take-off of said structure.

13. A combination aircraft and transient surface contact vehicle as claimed in claim 12, wherein said vehicle support means includes a forward strut pivotally mounted at one end at the nose of said structure end having a forward pontoon-like device constantly abutting said water surface at its spaced opposite end, and a pair of outrigger struts pivotally mounted at one end at the opposite tips of said wing and having means to absorb landing impact energy aft pontoon-like devices abutting said water surface at their spaced opposite ends upon settling on said surface and means for absorbing landing impact energy.

14. A combination aircraft and transient surface contact vehicle as claimed in claim 12, wherein said flight power means comprises a propeller rotatably mounted on said beam at said tail end thereof, an electric motor mounted on said beam and coupled to said propeller to drive same and a source of electrical energy connected to said motor for energizing said motor, said load comprises an explosive charge, said surface power means comprises rocket propulsion means and said fin means comprises a pair of fins each at a corresponding tip of said wing.

15. A combination aircraft and transient surface contact vehicle as claimed in claim 12, further comprising strut release means including timer means mounted on said structure and coupled to said outrigger struts for separating said outrigger struts from said structure at a predetermined time after actuation of said surface power means, wherein each of said struts comprises a substantially rigid tube curved at its opposite end and having a substantially teardrop shaped cross-section for reducing drag and strengthening said strut in the primary bending direction, each of said outrigger struts is mounted at a corresponding tip of said wing and each of said forward and outrigger struts is curved at its opposite end.

16. A combination aircraft and transient surface contact vehicle as claimed in claim 13, wherein said sensing means is coupled to said canard for driving said canard full nose down to collapse said forward strut at said end point thereby to bring said structure down to said water surface just prior to impact with said target.

17. A combination aircraft and transient surface contact vehicle as claimed in claim 13, further comprising a retractable mast pivotally affixed to said beam at one end and positioned next-adjacent said beam during flight of said structure and erecting means mounted on said beam and coupled to said mast for positioning said mast substantially perpendicularly to said beam and above said beam, said sensing means being mounted on said mast at the spaced opposite end thereof and a plurality of resilient means, damping means and shock absorbing means mounted on said structure at each of said struts and coupled to said struts for urging said pontoon-like devices of said struts against said water surface as said vehicle moves along said surface.

18. A transient surface contact vehicle as claimed in claim 13, wherein when said pontoon-like devices of said support means are made non-buoyant by said buoyancy control means, said structure sinks in a body of water and said pontoon-like devices are retracted and abut the bottom of the body of water.

19. A transient surface contact vehicle as claimed in claim 18, wherein said pontoon-like devices have substantially flat bottom surfaces with prow-like noses.

20. A transient surface contact vehicle as claimed in claim 18, wherein when said pontoon-like devices are made buoyant by said buoyancy control means, said structure floats up in said body of water until said pontoon-like devices abut said water surface at a second intermediate point, said pontoon-like devices are extended from said structure and said power means moves said vehicle along said water surface at said predetermined distance above said water surface and said position control means maintains said structure in surface-following contact with said body of water to impact with said target at said end point.

* * * * *

UNITED STATES PATENT AND TRADEMARK OFFICE
CERTIFICATE OF CORRECTION

PATENT NO. : 4,505,442
DATED : March 19, 1985
INVENTOR(S) : JEROME KIRSCH ET AL

It is certified that error appears in the above-identified patent and that said Letters Patent is hereby corrected as shown below:

Col. 11, lines 41 and 42, change "s-kid" to -- skid --

Col. 14, line 68, change "end" (last occurrence) to -- and --

Signed and Sealed this

Twenty-first Day of October, 1986

[SEAL]

Attest:

DONALD J. QUIGG

Attesting Officer

Commissioner of Patents and Trademarks